US00RE40944E

(19) United States
(12) Reissued Patent
Seyler et al.

(10) Patent Number: US RE40,944 E
(45) Date of Reissued Patent: Oct. 27, 2009

(54) ADJUSTABLE SHEAR VALVE MUD PULSER AND CONTROLS THEREFOR

(75) Inventors: Terry A. Seyler, South Jordan, UT (US); Macmillan M. Wisler, Kingwood, TX (US)

(73) Assignee: Baker Hughes Incorporated, Houston, TX (US)

(21) Appl. No.: 10/972,111

(22) Filed: Oct. 22, 2004

Related U.S. Patent Documents

Reissue of:
(64) Patent No.: 6,469,637
Issued: Oct. 22, 2002
Appl. No.: 09/373,138
Filed: Aug. 12, 1999

(51) Int. Cl.
*G01V 3/00* (2006.01)

(52) U.S. Cl. ..... 340/856.3; 340/853.3; 340/854.3; 367/84; 367/85; 181/102

(58) Field of Classification Search ..... 340/856.3, 340/854.3, 855.4; 367/83, 84, 85; 181/102
See application file for complete search history.

(56) References Cited

U.S. PATENT DOCUMENTS

| | | | | |
|---|---|---|---|---|
| 2,901,685 | A | 8/1959 | Alder | |
| 2,964,116 | A | 12/1960 | Peterson | |
| 2,973,505 | A | 2/1961 | Johannesen | |
| 3,065,416 | A | 11/1962 | Jeter | |
| 3,302,457 | A | 2/1967 | Mayes | |
| 3,309,656 | A | 3/1967 | Godbey | |
| 3,693,428 | A | 9/1972 | Le Peuvedic et al. | 73/151 |
| 3,713,089 | A | 1/1973 | Clacomb | 340/18 LD |
| 3,732,728 | A | 5/1973 | Fitzpatrick | 73/151 |
| 3,736,558 | A | 5/1973 | Cubberly, Jr. | 340/18 LD |
| 3,737,843 | A | 6/1973 | LePeuvedic et al. | 340/18 NC |
| 3,739,331 | A | 6/1973 | Godbey et al. | 340/18 LD |
| 3,742,443 | A | 6/1973 | Foster et al. | 340/18 LD |
| 3,764,968 | A | 10/1973 | Anderson | 340/18 NC |
| 3,764,969 | A | 10/1973 | Cubberly, Jr. | 340/18 NC |

(Continued)

FOREIGN PATENT DOCUMENTS

| | | | |
|---|---|---|---|
| GB | 2150172 | | 6/1984 |
| GB | 2156405 | A * | 10/1985 |

OTHER PUBLICATIONS

Improvements in MWD Telemetry: "The Right Data at the Right Time," B.A. Montaron, J–M.D. Hache, and Bernard Voisin, Anadrill/Schlumberger, SPE 25356, paper prepared for presentation at the SPE Asia Pacific Oil & Gas Conference & Exhibition held in Singapore, Feb. 8–10, 1993.

*Primary Examiner*—Timothy Edwards, Jr.
(74) *Attorney, Agent, or Firm*—Madan & Sriram, PC

(57) ABSTRACT

A telemetry system involving a shear-type mud pulser valve as the preferred embodiment is described. The control system includes a motor driver for the mud pulser which, in essence, moves one movable plate with respect to a stationary plate to create openings of various sizes. Pressure is sensed uphole of the pulser valve and is compared in real time to the desired pressure pulse amplitude. By allowing different relative rotational positions of the rotatable plate with respect to the stationary plate, different amplitudes can be achieved to further enhance the transmission of data to the surface. The control system compensates for wear in the mud pulser valve itself as well as drastic changes in mud flow and pressure. The configuration is simple and not prone to fouling from grit or other particles in the mud. The system is capable of creating an initial baseline array of a variety of pulse amplitudes, and thereafter providing the required relative rotation between the stationary and rotatable plates so as to be able to duplicate the baseline pulse amplitudes despite changes in the valve condition or in the flowing conditions of the mud.

65 Claims, 3 Drawing Sheets

U.S. PATENT DOCUMENTS

| | | | | | |
|---|---|---|---|---|---|
| 3,764,970 | A | | 10/1973 | Manning | 340/18 NC |
| 3,770,006 | A | | 11/1973 | Sexton et al. | 137/499 |
| 3,958,217 | A | | 5/1976 | Spinnler | 340/18 LD |
| 3,964,556 | A | | 6/1976 | Gearhart et al. | 175/45 |
| 3,982,224 | A | | 9/1976 | Patton | 340/18 NC |
| 4,007,805 | A | | 2/1977 | Reber | 181/120 |
| RE29,734 | E | | 8/1978 | Manning | 340/18 NC |
| RE30,055 | E | | 7/1979 | Claycomb | 340/18 LD |
| 4,351,037 | A | | 9/1982 | Scherbatskoy | 367/85 |
| 4,628,495 | A | | 12/1986 | Peppers et al. | 367/85 |
| 4,630,244 | A | * | 12/1986 | Larronde | 367/84 |
| RE32,463 | E | * | 7/1987 | Westlake et al. | 175/48 |
| 4,703,461 | A | | 10/1987 | Kotlyar | 367/83 |
| 4,734,892 | A | | 3/1988 | Kotlyar | 367/83 |
| 4,785,300 | A | | 11/1988 | Chin et al. | 340/861 |
| 4,790,393 | A | | 12/1988 | Larronde et al. | 175/40 |
| 4,914,637 | A | | 4/1990 | Goodsman | 367/83 |
| 5,115,415 | A | | 5/1992 | Mumby et al. | 367/85 |
| 5,119,344 | A | | 6/1992 | Innes | 367/84 |
| 5,182,731 | A | | 1/1993 | Hoelscher et al. | 367/84 |
| 5,189,645 | A | | 2/1993 | Innes | 367/84 |
| 5,215,152 | A | * | 6/1993 | Duckworth | 175/48 |
| 5,357,483 | A | | 10/1994 | Innes | 367/84 |
| 5,517,464 | A | | 5/1996 | Lerner et al. | 367/84 |
| 5,586,083 | A | | 12/1996 | Chin et al. | 367/84 |
| 5,586,084 | A | | 12/1996 | Barron et al. | 367/85 |
| 5,740,126 | A | | 4/1998 | Chin et al. | 367/84 |
| 6,636,159 | B1 | | 10/2003 | Winnacker | 340/854.3 |

* cited by examiner

ADJUSTABLE SHEAR VALVE MUD PULSER AND CONTROLS THEREFOR

Matter enclosed in heavy brackets [ ] appears in the original patent but forms no part of this reissue specification; matter printed in italics indicates the additions made by reissue.

FIELD OF THE INVENTION

The field of this invention relates to telemetry systems for transmitting data from downhole drilling assemblies to the surface, and more particularly to a mud-pulsing valve and control system which can generate multi-level signals by producing a variety of pressure amplitude levels so that the quantity of data encoded or the number of bits transmitted can be increased without increasing the frequency of the transmitted signal.

BACKGROUND OF THE INVENTION

Measurement-While-Drilling (MWD) or Logging-While-Drilling (LWD) applications use a mud-pulse system of telemetry to create acoustic signals in the drilling fluid that is circulated under pressure through the drillstring during drilling operations. Information acquired by downhole sensors is transmitted by suitably timing the formation of pressure pulses in the mud stream. This information is received and decoded by a pressure transducer and computer at the surface. Typically, these systems have involved a valve and a control mechanism known as a pulser or a mud pulser. Operation of the valve sends a pulse up the drillstring at the velocity of sound in the drilling mud. The rate of transmission of data is relatively slow due to pulse spreading, distortion, attenuation, modulation rate limitations, and other destructive forces such as ambient noise in the drillstring. The mud pulser generates digital 1's and 0's, depending on whether it is open or closed. One prior attempt to increase the data rate is to increase the frequency of the pulses. However, increasing the pulse frequency makes it more difficult to distinguish between adjacent pulses because of short resolution periods.

Negative pulsing systems employ a valve which temporarily allows flow from the drill collar into the annulus, thus bypassing the bit. These systems have a disadvantage of taking flow away from the bit. Positive pressure pulse systems have been- created by temporarily restricting the downward flow of drilling fluid by partial blocking of the fluid path in the drillstring. Pulse detection at the surface can sometimes become difficult due to attenuation and distortion of the signal and the presence of noise generated by the mud pumps, the downhole mud motor, and elsewhere in the drilling system. The presence of grit and other particles in the mud also creates certain operational problems for transducers in the drillstring. Both the positive and negative mud pulse systems generate base band signals. A desirable objective to increase the transmission rate of data is to provide an increased band width signal in the form that provides easy delineation at the surface of the well.

In the past, mud pulse systems that transmit mud pulse signals of differing amplitudes have been developed. In one design, a poppet and orifice structure uses a configuration which provides a tendency for the poppet to remain in the closed position. A bypass line is provided around the poppet and orifice and to a driving piston on the poppet. The poppet valve opens by a pilot valve connected on the bypass conduit of the piston assembly. When the pilot valve turns off, mud flow is blocked through the piston assembly. Relief valves are provided in the bypass conduit downstream of the piston.

These relief valves are pre-calibrated to a particular pressure level which causes each valve to leak mud to prevent the predetermined pressure level from being exceeded. Thus, use of a variety of relief valves allows for the creation of a pressure pulse with an independent amplitude. This system and variations thereof are described in detail in U.S. Pat. No. 5,586,084.

However, this system suffers from various disadvantages. The control that it provides over the movements of the poppet are, at best, indirect. Through the use of the bypass line, the movements of the poppet are controlled by an applied hydraulic pressure acting in conjunction with a spring force. The physical movements of the poppet are not measured; thus, when the relief valve or valves selected reach their predetermined release pressure, the specific amplitude of the pulse generated is uncertain. This is also because erosion on the orifice or poppet affects the amplitude of the pulse generated and the control system described in U.S. Pat. No. 5,586,084 has no provisions for compensation for such erosion effects. Additionally, the use of bypass passages in drilling mud service also creates potential plugging problems in the small components, which would undermine the effectiveness of that system. The system of the prior art thus requires the use of many relief valves or a motor-driven variable restrictor which further presents operational difficulties in mud service. These components must be calibrated for the poppet and orifice combination in its new condition and cannot respond effectively to effects of erosion or dramatic differences in mud flow rates and operating pressures.

It is an object of the present invention to provide a mud pulser whose position is, directly set in response to measured pressure uphole in the drill-string. Another objective of the present invention is to be able to obtain greater precision in the amplitude of the pulses generated by sensing not only the measured pressure, but also its rates of increase. Another objective is to use the measured pressure from the pulses generated to translate directly to physical movement of the mud pulser to obtain greater control of the pulse amplitudes generated. Another objective is to be able to create baseline amplitudes and to maintain such amplitudes despite changing physical conditions of the mud pulser or in pressure and flowrates of the mud circulating through the drillstring. These and other advantages of the present invention will become more apparent to those skilled in the art from a review of the preferred embodiment described below.

SUMMARY OF THE INVENTION

A telemetry system involving a shear-type mud pulser valve as the preferred embodiment is described. The control system includes a motor driver for the mud pulser which, in essence, moves one movable plate with respect to a stationary plate to create openings of various sizes. Pressure is sensed uphole of the pulser valve and is compared in real time to the desired pressure pulse amplitude. By allowing different relative rotational positions of the rotatable plate with respect to the stationary plate, different amplitudes can be achieved to further enhance the transmission of data to the surface. The control system compensates for wear in the mud pulse valve itself as well as drastic changes in mud flow and pressure. The configuration is simple and not prone to fouling from grit or other particles in the mud. The system is capable of creating an initial baseline array of a variety of pulse amplitudes, and thereafter providing the required relative rotation between the stationary and rotatable plates so as to be able to duplicate the baseline pulse amplitudes despite changes in the valve condition or in the flowing conditions of the mud.

DETAILED DESCRIPTION OF THE PREFERRED EMBODIMENT

Figure 1:
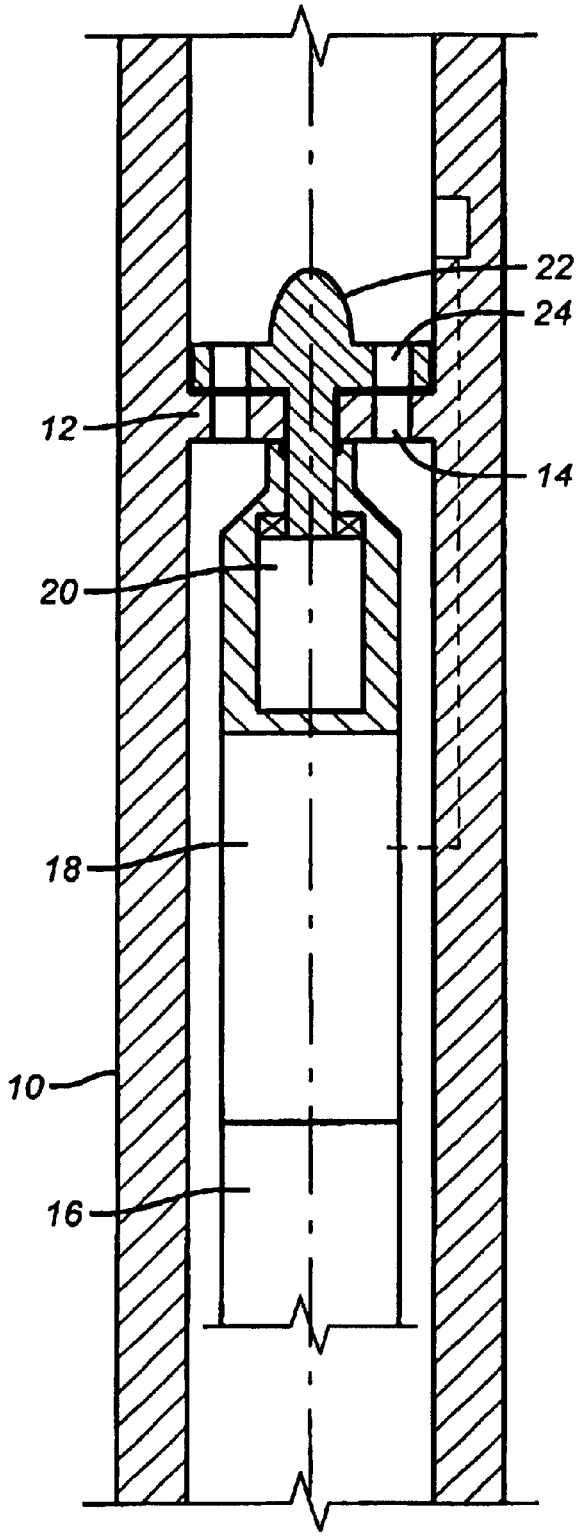
FIG. 1 is a sectional elevational view of the mud pulser valve.

FIG. 1 illustrates a drill collar 10 which is above the drill bit (not shown). Inside the drill collar 10 is a plate 12. Plate 12 has a series of openings 14. The shaped of the openings 14 in plate 12 are more clearly shown in FIG. 2 in plan view.

Figure 2:
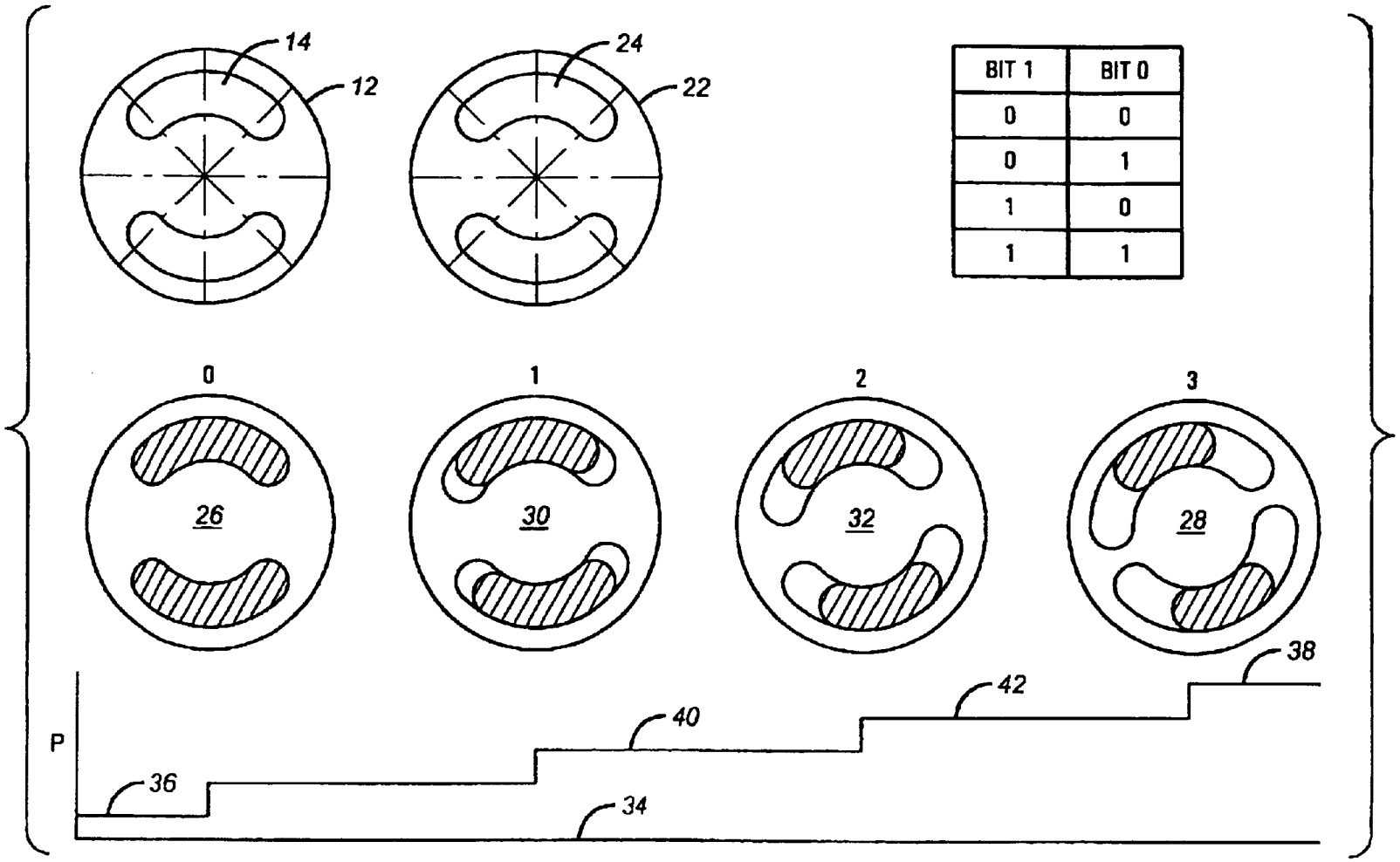
FIG. 2 shows four possible positions of the mud pulser and four amplitudes of the pulses generated in conjunction with those positions.

Supported within the drill collar 10 are downhole instrument 16 which are used for measurement of a variety of conditions downhole of the formation as well as the circulating mud. A processor 18 is mounted adjacent the instruments 16. One of the many functions of the processor 18 is to control the motor 20. Motor 20 is connected directly to plate 22, which is also shown in FIG. 2. Plate 22 has a series of openings 24 which, in the preferred embodiment, match the openings 14 of plate 12. The openings 14 and 24 are preferably crescent-shaped, but other configurations can be used without departing from the spirit of the invention. Motor 20 can orient plate 22 in different positions with respect to the fixed plate 12. FIG. 2 shows, from left to right, the maximum open position 26, the minimum open position 28, and two intermediate positions, 30 and 32. Also shown in FIG. 2 is a plot of pressure pulses generated, plotting the amplitude of the pulse against time. The baseline 34 represents the "no mud flow condition" in the wellbore and necessarily has an amplitude of "0" on the pressure scale which is on the "y" axis. Line 36 is the lowest amplitude pulse generated, which is consistent with the maximum open position 26. Similarly, line 38 is consistent with the minimum open position 28 and, therefore, has the highest amplitude. In between lines 40 and 42 represent the pulse generated with the plates in the positions indicated at 30 and 32. Those skilled in the art will appreciate that there is a great degree of variability in selecting each of the amplitudes of the pulses to be used in the telemetry system. Thus, the values of any of the lines 36–42 can be in equal increments or unequal increments, and the lowest to highest values can also vary. The processor 18, working in conjunction with the motor 20, can be used to achieve, within reason, any number of discrete pulse levels, the limiting value being that the pulse pressure amplitudes cannot be so close in height so as to make them indistinguishable at the surface in view of all the other conditions prevailing in the wellbore.

Figure 3:
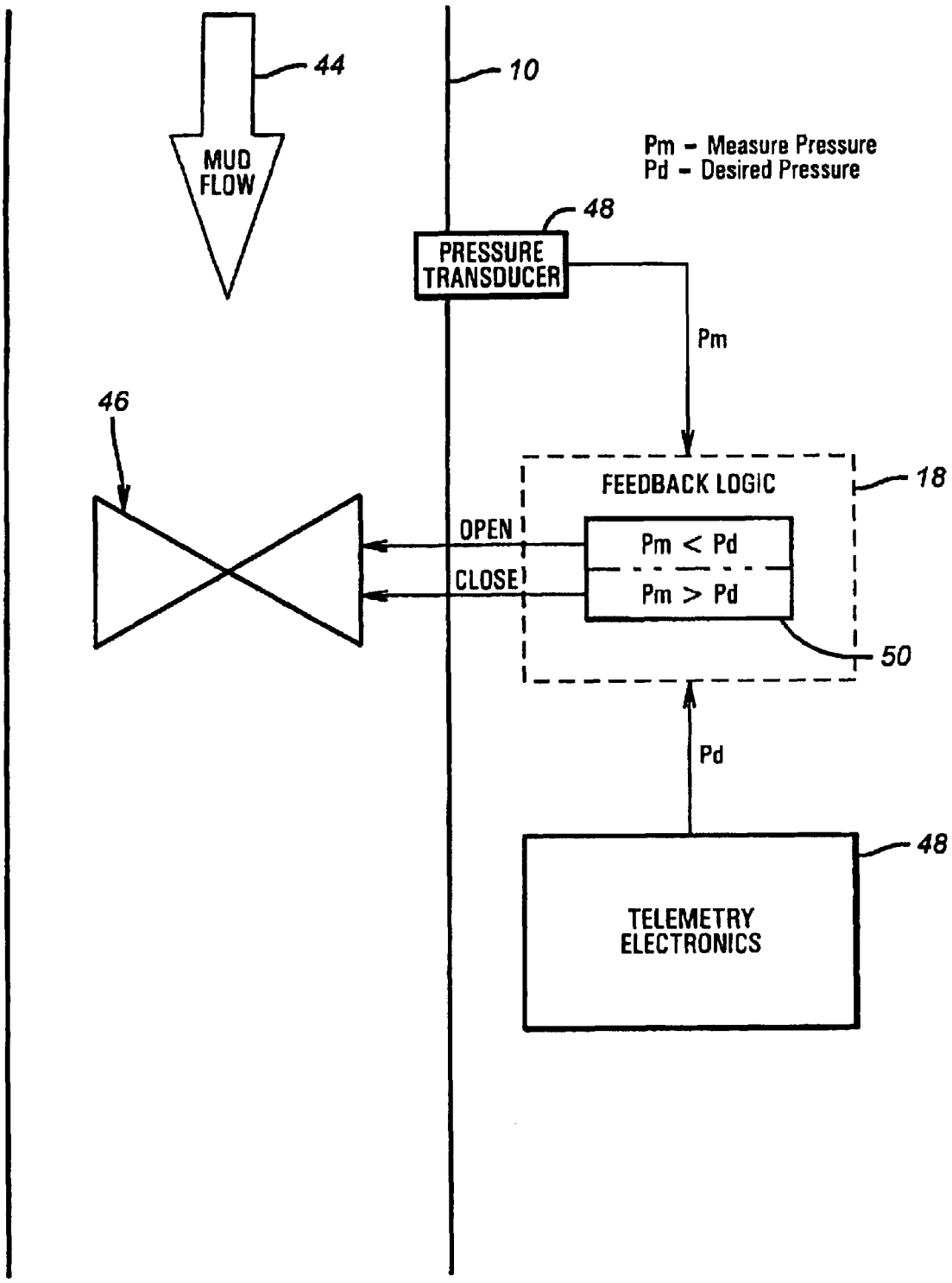
FIG. 3 is a schematic of the control system for the mud pulser.

The operation of the control system is illustrated in FIG. 3. Arrow 44 schematically represents the mud flow in the drill collar 10 past the mud pulser valve 46, which is illustrated in FIG. 1. A pressure transducer 48 is mounted in the drill collar 10. It measures the internal drill collar pressure, known as $p_m$, and provides that measured pressure signal to the processor 18. Telemetry electronics 48, generally located in the processor section 18, has stored within the desired pressure, $p_d$, of the pulse to be generated. Located within the processor 18 is a comparator 50 which compares the desired pressure $p_d$ to the measured pressure $p_m$ at the transducer 48 and determines which is greater. If $p_m$ is less than $p_d$, a signal is given through the motor 20 to close the pulser valve 46 by a discrete amount. Conversely, if $p_m$ exceeds $p_d$, a signal is given to the motor 20 to open the pulser valve 46 by a discrete amount. Each time the pressure transducer 48 takes a measurement, the process just described repeats itself. The telemetry electronics 48 can also process the transducer readings 48 to take first and higher order measurements so that not only is the absolute pressure value sensed, but trends in the change in pressure values over time can also be sensed to enhance the ability to control the position of the pulser valve 46 in order to produce the desired pulse amplitude, as illustrated, for example, in FIG. 2, while minimizing overshot and hunting.

Those skilled in the art can now see that the system described above, by increasing the number of available pressure pulse amplitudes dramatically increases the quantity of data encoded or the number of bits transmitted without increasing the frequency of the transmitted signal. The pressure measurement is direct at transducer 48. The output from the comparator 50 results in a direct physical movement of the motor 20, which in the preferred embodiment can be stepper motor. There is no dependence on the circulating mud to position the pulser valve 46, as disclosed in U.S. Pat. No. 5,586,084. The control of the pulser valve 46 is direct by motor 20. Wear in the openings 14 and 24 can be compensated for by the processor 18. In essence, at the start of operations, the baseline is established for the various pulses, as shown in FIG. 2. Thereafter, the relative positions of the plates 12 and 22 can be adjusted to duplicate the target amplitudes shown in FIG. 2 for the discrete pulses initially established. Thus, because the control system illustrated in FIG. 3 for the positioning of the pulser valve 46 is not dependent on flow and/or pressure drop conditions for movement of the pulser valve 46, duplication of the pulse heights shown in FIG. 2 can occur, despite any erosive effects on the openings 14 and 24 from the grit in the circulating mud. Similarly, within a certain range, a change in the pressure and/or mud flowrate can also be compensated for by the processor 18. This is because the pulse heights are measured directly at transducer 48 such that upon change in the flow and pressure conditions of the mud, the positions 26–32 can be varied so as to replicate the initial standard pulse heights illustrated in FIG. 2 which are initially established. Should the variation in mud flowrate and pressure exceed a certain predetermined limit, the processor 18 can reestablish new pulse amplitudes for the then-existing conditions and so inform the surface processor that it is, in fact, reestablish a new correlation between the pulse amplitudes and the existing mud circulation conditions.

Additionally, the shape of the pulse can also be controlled by this invention. It is known in the art that pulses can become skewed in time and thus made harder to detect at the surface because of shape or phase distortion. The pressure feedback and rapid aperture response of the present invention allows optimal pulse shaping for optimal detection at the surface.

In other respects, the nature of the pulse signaling generated by the pulser valve 46 using binary 0's and 1's is similar to the techniques of the prior art, such as, for example, illustrated in U.S. Pat. No. 5,586,084. The design of the actual pulser valve 46 itself is commonly referred to as a shear valve and can be of a type used and disclosed in U.S. Pat. No. 4,630,244.

With the present invention, narrow bypass passages which could clog up with grit and other particles in the drilling mud, are not employed. These techniques represent one of the shortcomings in the prior attempts to transmit larger amounts of data faster, as illustrated in U.S. Pat. No. 5,586,084. Yet another advantage of the present invention is the direct control of the mud pulser 46 and the ability to more finely control the shape of the pulses, such as illustrated in FIG. 2, by sensing on a frequent basis the pressure pulses generated in the drill collar 10, while having in place a system to compensate for wear on the mud pulser valve 46 as well as change in flow and pressure conditions of the drilling mud. The system is not limited to predetermined amplitude variations of the various pulses which are to be generated. It is highly variable and can be set up for the conditions of a particular well. This is to be contrasted with the technique in U.S. Pat. No. 5,586,084 which in one embodiment requires discrete relief valves for the purpose of generating the multiple amplitudes. Because of the nature of the driving system for the poppet in that prior technique, there also exists a possibility of not being able to finely control the movements of the poppet as it hunts below and above the desired final setpoint for each of the relief valves selected. While U.S. Pat. No. 5,586,084 illustrates an alternative embodiment replacing the discrete relief valves with a variable choke, the control in that system is still indirect as it throttles a flow in a bypass line rather than giving direct command controls to the poppet by physically moving it to a proper position. As a result, the technique of the present invention allows for a great deal of variability in selecting a multiplicity of amplitudes for pulses and a high degree of repeatability, despite changing conditions in the flowing mud or in the valve 46 itself.

The foregoing disclosure and description of the invention are illustrative and explanatory thereof, and various changes in the size, shape and materials, as well as in the details of the illustrated construction, may be made without departing from the spirit of the invention.

What is claimed is:

1. A control system for generating multilevel signals in a tubular string having a fluid flowpath and a downhole telemetry system using a pulser valve in said *fluid* flowpath, comprising:

a pulser valve operable in multiple positions comprising a maximum and minimum open position and at least one position in between;

a driver connected to said pulser valve; [and]

[a flowpath mounted] controller [connected to said driver so as] *configured* to create *pressure* pulses with said pulser valve by commanding said driver to re-position said pulser valve [in fixed increments] independent of flow and pressure conditions of *a* circulating mud *in the fluid flow path;*

*a sensor to sense amplitudes of the pressure pulses for use by the controller to control the pulser valve.*

2. The system of claim 1, [further comprising:

a pressure] *wherein the* sensor is mounted in a position downhole [to sense the amplitudes of pressure pulses created by operation of the pulser valve and communicate said measured pressures to said controller].

3. The system of claim 2, wherein:

said controller is capable of creating baseline amplitudes of pressure using said sensor as feedback, each baseline amplitude corresponding to a different position of said pulser valve.

4. The system of claim 3, wherein:

said controller compensates for wear in said pulser valve by using feedback from said sensor to alter at least one position of said pulser valve to achieve any desired pulse amplitude previously established as baseline.

5. The system of claim 3, wherein:

said controller uses [pressure] measurements of said sensor to change the pulse shape to optimize surface detection by commanding [through] said driver [a variation in] *to vary* at least one preset position corresponding to a baseline desired amplitude.

6. The system of claim [3] *1*, wherein:

said pulser valve comprises a movable plate directly driven by said driver and having at least one opening thereon and a stationary plate having at least one opening thereon.

7. The system of claim 6, wherein:

said driver [rotating] *rotates* said movable plate to alter [the] *an* alignment between *the* openings on said plates to create desired [pressure] amplitudes *of the pressure pulses* for signal transmission to the surface.

8. A control system for generating multilevel signals in a downhole telemetry system using a pulser valve, comprising:

a pulser valve operable in multiple positions comprising a maximum and minimum open position and at least one position in between;

a driver connected to said pulser valve; [and]

a controller connected to said driver so as to create pulses with said pulser valve by commanding said driver to position said pulser valve;

a [pressure] sensor mounted in a position downhole to sense the amplitudes of [pressure] *the* pulses created by operation of said pulser valve and communicate said [measured pressures] *sensed amplitudes* to said controller, *wherein* said controller is capable of creating baseline amplitudes of pressure using said sensor as feedback, each baseline amplitude corresponding to a different position of said pulser valve; *and* said controller using said sensor determines when well conditions have changed sufficiently to that the baseline amplitudes can no longer be achieved with previously set pulser valve positions, whereupon said controller establishes new positions of said pulser valve to reobtain said previously used baseline amplitudes.

9. The system of claim 8, wherein:

said controller signals to the surface [to the effect that] *the* new positions of said pulser valve [are being selected to correspond to new or to the preexisting baseline pressure amplitudes].

10. A telemetry method for sending signals from downhole to the surface, comprising:

providing a multiposition pulser valve downhole;

creating a plurality of pressure [amplitudes] *pulses* with said pulser valve; [and]

providing a driver to directly position said pulser valve in predetermined increments independent of flow and pressure conditions of circulating mud so as to obtain said [amplitudes] *pressure pulses;*

*providing a sensor for measuring amplitudes of the pressure pulses created by said pulser valve; and*

*communicating the measured amplitudes to a controller.*

11. The method of claim 10, further comprising:

[providing a pressure sensor for measuring amplitude of pressure pulses created by said pulser valve;

communicating measured pulses to a controller; and]

regulating said driver with said controller.

12. The method of claim [11] *10*, further comprising:

using said [pressure] sensor to compensate for wear in said pulser valve by having said controller direct a change in movement of said driver so as to reposition said pulser valve to obtain [the] desired pressure amplitude*s* despite said wear.

13. The method of claim [11] *10*, further comprising:

programming said controller with a plurality of desired amplitudes; and using said [pressure] sensor for feedback to said controller to obtain said desired pressure amplitudes.

14. The method of claim [11]*10*, further comprising:

using said controller to change the shape of the [generated] *created* pressure pulse*s* by controlling the operation of [said driver and in turn] said pulser valve so as to optimize surface detection of the [signal] *signals*.

15. The method of claim [11]*10*, further comprising:

using a stationary and a rotating disc with an opening on each *disc* as said pulser valve;

driving said rotating disc directly with said driver on command from said controller; and changing the opening size through said discs by said rotation of said rotating disc.

16. A telemetry method for sending signals from downhole to the surface, comprising:

providing a multiposition pulser valve downhole;

creating a plurality of pressure [amplitudes] *pulses* with said pulser valve; [and]

providing a driver to directly position said pulser valve so as to obtain said amplitudes;

providing a [pressure] sensor for measuring amplitude of the pressure pulses created by said pulser valve;

communicating *the* measured [pulses] *amplitudes* to a controller; [and]

regulating said driver with said controller;

establishing a plurality of discrete baseline amplitudes [as a baseline];

using said sensor in conjunction with said controller and said driver to obtain said *baseline* amplitudes; and communicating said baseline amplitudes to the surface.

17. A telemetry method for sending signals from downhole to the surface, comprising:

providing a multiposition pulser valve downhole;

creating a plurality of pressure [amplitudes] *pulses* with said pulser valve; [and]

providing a driver to directly position said pulser valve so as to obtain said [amplitudes] *pressure pulses*;

providing a [pressure] sensor for measuring amplitude*s* of the pressure pulses created by said pulser valve;

communicating the measured *amplitudes of the pressure* pulses to a controller; [and]

regulating said driver with said controller;

programming said controller with a plurality of desired amplitudes; [and]

using said pressure sensor for feedback to said controller to obtain said desired amplitudes;

comparing the measured amplitude*s* to the desired amplitude*s*; and using said controller to actuate said driver to reposition said pulser valve to allow an approach to the desired [amplitude] *amplitudes*.

18. A telemetry method for sending signals from downhole to the surface, comprising:

providing a multiposition pulser valve downhole;

creating a plurality of pressure [amplitudes] *pulses* with said pulser valve; and providing a driver to [directly] position said pulser valve so as to obtain said [amplitudes] *pressure pulses*;

providing a pressure sensor for measuring an amplitude of *the* pressure pulses created by said pulser valve;

communicating *the* measured [pulse] *amplitude* to a controller; and regulating said driver with said controller;

programming said controller with a [plurality]of desired [amplitudes] *amplitude*; and using said pressure sensor for feedback to said controller to obtain said desired amplitudes;

processing the measured pressure *amplitude* and its rate of change by said controller;

using said measured [pressure] *amplitude* and rate of change [information to] *sending a* command *to* said driver to alter the position of said pulser valve in a manner so as to minimize hunting or overshot of the [targeted] *desired* amplitude.

19. A telemetry method for sending signals from downhole to the surface, comprising:

providing a multiposition pulser valve downhole;

creating a plurality of pressure [amplitudes] *pulses* with said pulser valve; and providing a driver to [directly] position said pulser valve so as to obtain said [amplitudes] *pressure pulse*;

providing a pressure sensor for measuring [amplitude] *an amplitude* of the pressure pulses created by said pulser valve;

communicating *the* measured [pulses] *amplitude* to a controller; [and]

regulating said driver with said controller;

sensing when well flow conditions have changed to no longer permit [the] *a* desired [amplitudes] *amplitude* to be achieved with available positions of said pulser valve;

creating new baseline amplitudes with said controller for the [new] *changed* well flow conditions;

communicating to the surface a signal that new baseline amplitudes have been [selected] *created*; and using the newly created baseline amplitudes for signal transmission to the surface.

*20. An apparatus for generating pressure pulses in a fluid flowing in a wellbore, comprising:*

*a stator in a path of the fluid;*

*a rotor proximate the stator, said rotor generating pressure pulses in the fluid when oriented at a plurality of positions proximate the stator; and*

*a driver controllably orienting the rotor in an open direction and a closed direction at the plurality of positions to obstruct flow of the fluid to generate pressure pulses in the fluid at more than one amplitude; and*

*a sensor for taking measurements downhole relating to the pressure pulses.*

*21. The apparatus of claim 20, wherein the sensor is located in the flow of the fluid.*

*22. The apparatus of claim 20 further comprising a controller to re-orient the rotor in fixed increments.*

*23. The apparatus of claim 20 further comprising a controller that uses the sensor measurements to change a shape of the pressure pulses to enhance detection of the pressure pulses at a surface location.*

*24. The apparatus of claim 20, wherein the driver is a motor that is directly coupled to the rotor.*

*25. The apparatus of claim 20, further comprising a controller that controls the driver in response to the sensor measurements.*

*26. The apparatus of claim 25, wherein the controller positions the rotor directly in response to a measured pressure.*

*27. An apparatus for generating pressure pulses in a fluid flowing in a wellbore, comprising:*

*a stator in a path of the fluid;*

*a rotor proximate the stator, said rotor generating pressure pulses in the fluid when oriented at a plurality of positions proximate the stator;*

*a driver controllably orienting the rotor in an open direction and a closed direction at the plurality of positions to obstruct flow of the fluid to generate pressure pulses in the fluid at more than one amplitude; and*

*a controller that controls the driver to change amplitude of the pressure pulses in response to a pressure measurement made by a sensor downhole.*

*28. An apparatus for generating pressure pulses in a fluid flowing in a wellbore, comprising:*

*a first member having an opening that allows the fluid to pass therethrough;*

*a second member that is adapted to be oriented at multiple positions to obstruct the fluid flow through the first member to generate pressure pulses having different amplitudes; and*

*a driver that positions the second member at the multiple positions to generate the pressure pulses having different amplitudes; and*

*a controller that controls the driver in response to a measurement made by a sensor downhole.*

*29. An apparatus for generating signals in a downhole fluid flow path, comprising:*

*a stationary member having an opening that allows the fluid to pass therethrough;*

*a rotatable member having an opening and adapted to be rotated relative to the stationary member to create openings of different sizes for the fluid flow path through the stationary member to generate signals in the downhole fluid; and*

*a controller that controls the rotatable member in response to a measurement made by a sensor downhole.*

*30. The apparatus of claim 29, wherein the controller positions the rotatable member at different positions relative to the stationary member to produce pulses of different amplitudes.*

*31. The apparatus of claim 30, further comprising a motor coupled to the rotatable member.*

*32. The apparatus of claim 31, further comprising a processor that controls the motor.*

*33. The telemetry system of claim 30, further comprising a pressure sensor downhole for making the pressure measurement that controls the driver.*

*34. The telemetry system of claim 30, wherein the driver is a motor.*

*35. The telemetry system of claim 34, wherein the motor is directly coupled to the rotor.*

*36. The telemetry system of claim 30, wherein the driver controls the rotor to generate pressure pulses of different amplitudes.*

*37. A telemetry system, comprising:*

*a drill string having a fluid flowing therethrough;*

*a pulser in a path of the fluid in the drill string, the pulser including a rotor proximate a stator, each of the rotor and stator having an opening to allow fluid flow therethrough; and*

*a driver controllably rotating the rotor in an open direction and a closed direction to obstruct flow of the fluid to generate pressure pulses in the fluid at more than one amplitude; and*

*a controller that controls the driver in response to a measurement made relating to the generated pulses.*

*38. A pulser system for generating pressure pulses in a downhole flowing fluid, comprising:*

*a tubular string having a first member disposed therein, the first member having a first opening for flowing fluid therethrough;*

*a second member substantially coaxial with and rotatable relative to the first member proximate the first member, the second member having a second opening for flowing fluid therethrough; and*

*a motor coupled to the second member, the motor rotating the second member in a first direction and a second opposite direction to locate the second member at a predetermined position such that the second member at least partially obstructs the fluid flowing through the first opening thereby generating a pressure pulse, the predetermined position comprising (i) a maximum open position, (ii) a minimum open position, and (iii) at least one intermediate position; and a controller that is configured to re-position the second member in fixed positions independent of flow and pressure conditions of the fluid flow.*

*39. The pulser system of claim 38, further comprising a pressure sensor to sense the amplitudes of pressure pulses for use by said controller.*

*40. The pulser system of claim 41, wherein said controller uses the pressure measurements of said sensor to change a pulse shape.*

*41. A telemetry method, comprising:*

*providing a pulser in a fluid flow path downhole, the pulser having a rotor proximate a stator, each said stator and rotor having an opening to allow the fluid to flow therethrough; and*

*generating pressure pulses in the downhole fluid by controllably rotating the rotor to obstruct the flow of the fluid through the stator; and*

*taking a measurement of a characteristic of the pressure pulses downhole and controlling the rotor in response to the measurement.*

*42. The telemetry method of claim 41, wherein rotating the rotor further comprises positioning the rotor relative to the stator at difference positions to generate pressure pulses of different amplitudes.*

*43. The telemetry method of claim 41 further comprising measuring a pressure downhole and controlling the rotor in response to the measured pressure to choose an amplitude of the generated pressure pulses.*

*44. The telemetry method of claim 41 further comprising directly coupling the motor to the rotor.*

*45. The telemetry method of claim 44 further comprising providing a controller downhole to control the motor.*

*46. A method of transmitting information from a downhole location to a surface location through a fluid stream in a wellbore, comprising:*

*rotating a rotatable plate of a valve pulser in the wellbore relative to a stationary plate to different positions to obstruct fluid flow through the stationary plate to generate pressure pulses in the fluid stream; and*

*controlling the rotating of the rotatable plate to control a characteristic of the generated pressure pulses in response to a pressure measured downhole.*

*47. The method of claim 46 wherein rotating the rotatable plate includes positioning the rotatable plate to generate pressure pulses of different amplitudes.*

*48. The method of claim 46 further comprising providing a pressure transducer to measure the pressure downhole.*

*49. The method of claim 46 further comprising providing a processor to control the characteristic of the pressure pulses.*

*50. The method of claim 46 wherein a motor orients the rotatable plate in the different positions.*

*51. The method of claim 50 further comprising connecting the motor directly to the rotatable plate.*

*52. The method of claim 46 wherein the characteristic is pulse amplitude and the method further comprises adjusting the pulse amplitude of the pressure pulses.*

*53. The method of claim 52 wherein adjusting the pulse amplitude includes adjusting the rotation of the rotatable plate in response to a pressure measured downhole.*

*54. The method of claim 53 further comprising increasing the pulse amplitude of the generated pressure pulses when the measured pressure is less than a predetermined value and decreasing the pulse amplitude of the generated pressure pulses when the measured pressure is greater than the predetermined value.*

*55. The method of claim 52 wherein adjusting the amplitude of the generated pressure pulses includes adjusting the amplitude based on a rate of increase of the generated pulses.*

*56. The method of claim 46 wherein the characteristic of the generated pressure pulses is a pulse shape.*

*57. The method of claim 56 wherein a processor controls the shape of the generated pulses to enhance surface detection.*

*58. The method of claim 57 wherein the processor controls the characteristic of the pressure pulses independent of a flow condition of the fluid stream.*

*59. A shear valve pulser for transmitting information in the form of pressure pulses in a fluid stream downhole in a wellbore, comprising:*

*a stationary plate having an opening that allows flow of the fluid therethrough;*

*a rotatable plate proximate the stationary plate adapted to rotate relative to the stationary plate to close and open the opening in the stationary plate to generate the pressure pulses in the fluid stream;*

*a motor coupled to the rotatable plate for controllably rotating the rotatable plate; and*

*a controller controlling the rotatable plate in response to a pressure measurement made downhole to position the rotating plate in different positions relative to the fixed plate to control the generated pressure pulses.*

*60. The shear valve pulser of claim 59 wherein the controller rotates the rotatable plate to control amplitude of the generated pressure pulses.*

*61. The shear valve pulser of claim 59 wherein the controller rotates the rotatable plate to control a shape of the generated pressure pulses.*

*62. The shear valve pulser of claim 59 further comprising a pressure transducer that measures the pressure downhole.*

*63. The shear valve pulser of claim 59 wherein the controller controls the generated pressure pulses during drilling of a wellbore.*

*64. The shear valve pulser of claim 59 wherein the motor is directly coupled to the rotatable plate.*

*65. The shear valve pulser of claim 59 wherein the controller controls the pressure pulses in response to sensing a rate of increase of amplitude of the pressure pulses.*

* * * * *

UNITED STATES PATENT AND TRADEMARK OFFICE

CERTIFICATE OF CORRECTION

PATENT NO. : RE 40,944 E
APPLICATION NO. : 10/972111
DATED : October 27, 2009
INVENTOR(S) : Terry A. Seyler and Macmillan M. Wisler It is certified that error appears in the above-identified patent and that said Letters Patent is hereby corrected as shown below:

Column 6, claim 8, line 34, delete "sufficiently to", and insert --sufficiently so--;

Column 7, claim 16, line 28, delete "amplitudes", insert --[amplitudes] *pressure pulses*--;

Column 9, claim 33, line 52, delete "claim 30", insert --claim 37--;

Column 9, claim 34, line 55, delete "claim 30", insert --claim 37--;

Column 9, claim 36, line 59, delete "claim 30", insert --claim 37--;

Column 10, claim 40, line 31, delete "claim 41", insert --claim 39--; and

Column 10, claim 42, line 48, delete "at difference", insert --at different--.

Signed and Sealed this

Fourteenth Day of December, 2010

David J. Kappos

David J. Kappos
*Director of the United States Patent and Trademark Office*